J. B. GATHRIGHT.
Harvester-Droppers.
No. 136,370. Patented March 4, 1873.
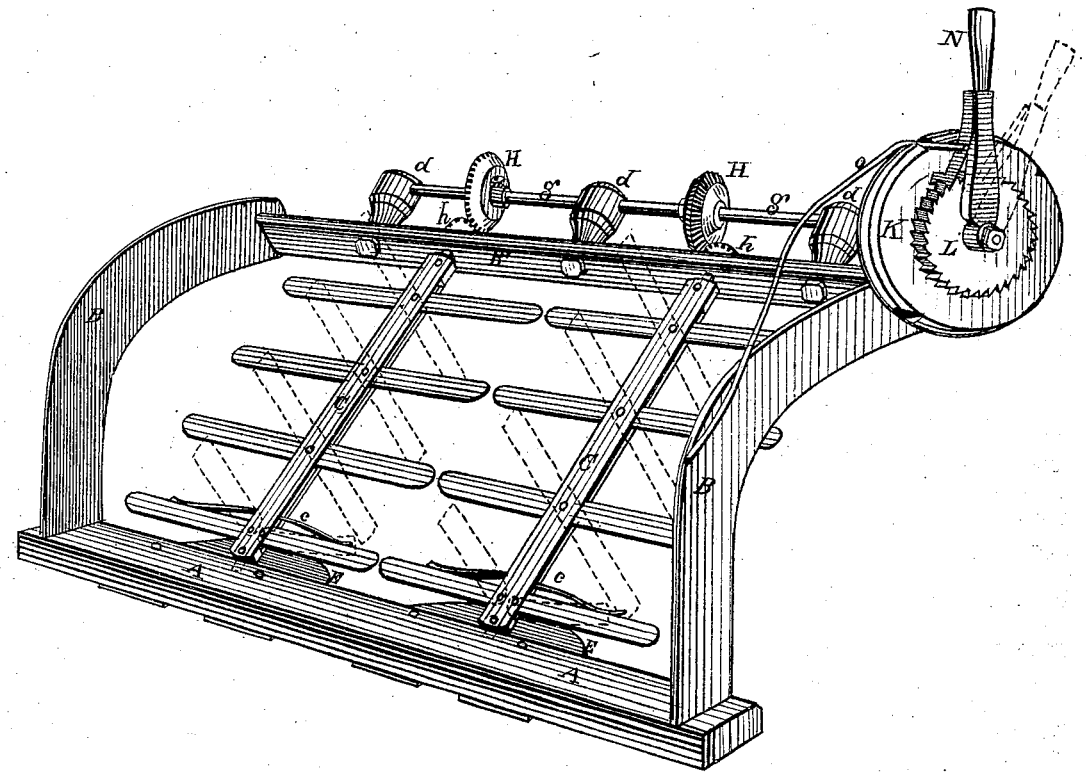
WITNESSES: INVENTOR.

UNITED STATES PATENT OFFICE.

JOSIAH B. GATHRIGHT, OF LOUISVILLE, KENTUCKY.

IMPROVEMENT IN HARVESTER-DROPPERS.

Specification forming part of Letters Patent No. 136,370, dated March 4, 1873.

*To all whom it may concern:*

Be it known that I, JOSIAH B. GATHRIGHT, of the city of Louisville, county of Jefferson, State of Kentucky, have invented a new and useful Self-Discharging Platform for Harvesting-Machines; and I hereby declare that the following is a full and correct specification, reference being had to the accompanying drawing, which forms a part of the specification.

In the drawing, A represents the finger-bar of the machine. B B B' is a rectangular frame, of suitable length and width for a platform, and is secured to the rear edge of the finger-bar, in the position and at the angle of inclination desired for the platform. Within this frame two reversible gates or trap-doors, C C, similar in all respects, are pivoted so that each will occupy half the open space within the frame, and together form a platform or support for the falling grain. These gates C C are pivoted upon shafts running through their longitudinal centers, the forward ends of the shafts having bearings in or near the rear edge of the finger-bar, while the rear ends have bearings in the rear bar B' of the frame B B B'. These last journals extend through their bearings in B', and upon the end of each is fixed a small beveled pinion, h h. The shaft g is at right angles with the shafts about which the gates revolve, and is supported by suitable bearings d attached to and extending from the bar B'. Upon the shaft g are two beveled-cog wheels, H H, double the size of pinions h h, and gearing into them. On the end of the shaft g nearest the driver is a pawl-lever, N, and a ratchet-wheel, L, by means of which motion is imparted to the shaft, and, through the gearings, to the gates C C. If the lever be moved forward a quarter-circle (the cogs H H being double the size of pinions h h) the gates will be turned half around or upside down, and, of course, will turn under and drop any grain that may have accummulated upon them; and if the gearings be so made as to cause the gates to turn toward each other, they will bundle the grain and drop it between them. The two sides of the gates, thus working alternately as grain-supports, are, of course, made substantially alike. To gage the movements of the gates, and to stop them and hold them in proper position after each discharge, the wheel K is fixed upon shaft g, and upon the face of the wheel four equidistant notches are made, and the spring O is so placed as to ride the face of the wheel and drop into these notches consecutively, thus holding the wheel until the lever again starts forward and forces the spring out of the notch. To prevent those parts of the gate which are nearest the finger-bar (and hence nearest the ground) from striking the ground while turning, the lower arms are hinged to the shaft, so that they may be bent or folded rearward from the finger-bar, and suitable-shaped guides E E are attached to the finger-bar, and extend back under the shafts so that the arms in turning will strike and ride around upon the edges of the guides, and thus be so deflected from their course as to prevent their striking the ground. Any number, or all the arms, may be similarly hinged, and may be operated the same way by being connected by rods with the arms that are deflected by the guides. Springs, as c c, may be used to restore the arms to position.

If it be desired to have solid or unbroken surfaces for the gates, it may be done without interfering with the above-described movements by covering the gates with coarse cloth.

The guide E E may be in the form of sleeves, and may fit more or less closely about the shafts; they may also be so constructed as to begin to bend the hinged arms, as they come down, a little before they reach the position of rest. This will prevent the lower inner arms of the gate from striking upon the gavel as they come down, and leaves space between the finger-bar and these arms for the butts of the gavel to pass through.

This dropper may be operated by foot or by hand, or automatically by suitable connection with the machinery of the harvester.

Having thus described my invention, what I claim as new, and desire to secure by Letters Patent, is—

1. A platform for harvesting-machines, composed of the reversible gates C C. having their lower arms flexibly connected with the shafts, substantially as and for the purpose herein shown and described.

2. In combination with the gates C C, the guides E E, operating substantially as herein shown and described.

3. The gates C C, guides E E, pinions $h\,h$, cogs H H, shaft $g$, wheels K and L, and lever N, arranged and operating substantially as herein shown and described.

Signed by me December 24, 1872.

JOSIAH B. GATHRIGHT.

Witnesses:
O. GATHRIGHT, Jr.,
CLAUDE W. PETTIBONE.